United States Patent
Fan et al.

(10) Patent No.: US 11,902,053 B2
(45) Date of Patent: *Feb. 13, 2024

(54) METHODS AND DEVICES FOR CHANNEL ESTIMATION

(71) Applicant: Telefonaktiebolaget LM Ericsson (publ), Stockholm (SE)

(72) Inventors: Rui Fan, Beijing (CN); Hai Wang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/090,770

(22) Filed: Dec. 29, 2022

(65) Prior Publication Data

US 2023/0143268 A1 May 11, 2023

Related U.S. Application Data

(63) Continuation of application No. 17/255,096, filed as application No. PCT/CN2018/093406 on Jun. 28, 2018, now Pat. No. 11,546,191.

(51) Int. Cl.
*H04L 25/02* (2006.01)
*H04B 7/0456* (2017.01)
(Continued)

(52) U.S. Cl.
CPC ....... *H04L 25/0202* (2013.01); *H04B 7/0456* (2013.01); *H04L 5/0048* (2013.01); *H04W 72/23* (2023.01); *H04W 72/0446* (2013.01)

(58) Field of Classification Search
CPC . H04L 25/0202; H04L 5/0048; H04L 5/0023; H04L 5/0051; H04B 7/0456; H04B 7/0413; H04W 72/042; H04W 72/0446
See application file for complete search history.

(56) References Cited

U.S. PATENT DOCUMENTS

2011/0317748 A1  12/2011  Li et al.
2012/0120997 A1*  5/2012  Park ................. H04B 7/0456
                                                    375/224

(Continued)

FOREIGN PATENT DOCUMENTS

CN  104639476 A  5/2015
CN  105794142 A  7/2016

OTHER PUBLICATIONS

Interdigital Inc., "On Demodulation Reference Signal for Non-orthogonal Multiple Access", 3GPP TSG RAN WG1 Meeting #93, R1-1807030, Busan, South Korea, May 21-25, 2018, 1-4.

(Continued)

*Primary Examiner* — Dady Chery (74) *Attorney, Agent, or Firm* — Murphy, Bilak & Homiller, PLLC (57) ABSTRACT

The present disclosure provides a method (100) in a network device for channel estimation. The method (100) includes: transmitting (110) to a terminal device an instruction to precode each of a number, L, of DeModulation Reference Signals, DMRSs, using a number, N, of linearly independent precoders, respectively; receiving (120) from the terminal device L*N precoded DMRSs; estimating (130) an equivalent channel associated with an uplink channel from the terminal device to the network device based on one or more of the L*N precoded DMRSs; and determining (140) the uplink channel from the equivalent channel based on the N precoders.

18 Claims, 8 Drawing Sheets

(51) Int. Cl.
*H04L 5/00* (2006.01)
*H04W 72/23* (2023.01)
*H04W 72/0446* (2023.01)

(56) References Cited

U.S. PATENT DOCUMENTS

| | | |
|---|---|---|
| 2013/0107746 A1 | 5/2013 | Wang et al. |
| 2015/0065153 A1 | 3/2015 | Nissila et al. |
| 2020/0021339 A1* | 1/2020 | Wu ........................ H04B 7/0697 |
| 2020/0153488 A1* | 5/2020 | Wu ........................ H04B 7/0417 |
| 2020/0163112 A1* | 5/2020 | Lee ................... H04W 72/1284 |
| 2020/0186208 A1* | 6/2020 | Molés Cases ....... H04B 7/0478 |

OTHER PUBLICATIONS

Sony, "NR-PBCH DMRS sequence and mapping design", 3GPP TSG RAN WG1 Meeting #90, R1-1712959, Prague, Czech Republic, Aug. 21-25, 2017, 1-9.

ZTE, "Collision between DMRS and PSS/SSS in NCT", 3GPP TSG RAN WG1 Meeting #73, R1-132094, Fukuoka, Japan, May 20-24, 2013, 1-6.

\* cited by examiner

METHODS AND DEVICES FOR CHANNEL ESTIMATION

TECHNICAL FIELD

The present disclosure relates to wireless communication, and more particularly, to methods and devices for channel estimation.

BACKGROUND

Multiple Input Multiple Output (MIMO), particularly Multi-User MIMO (MU-MIMO) is a technique that can increase system throughput very effectively. Theoretically, when a number, M, of antennas are equipped at a network device (e.g., an evolved NodeB, or eNB), an M-layer MU-MIMO system can be supported or an increase of throughput by a factor of M can be achieved.

In order for a MIMO system to work properly, it is important that the network device knows channels to/from all terminal devices (e.g., User Equipments, or UEs) to be grouped. For example, an eNB can allocate a Sounding Reference Signal (SRS) to a UE. Upon receiving the SRS from the UE, the eNB can estimate an uplink channel from the UE to the eNB based on measurement of the SRS. In a Time Division Duplex (TDD) system, in addition to the uplink channel, the eNB can obtain a downlink channel from the eNB to the UE due to channel reciprocity in TDD system.

SUMMARY

It is an object of the present disclosure to provide methods and devices for channel estimation.

According to a first aspect of the present disclosure, a method in a network device for channel estimation is provided. The method includes: transmitting to a terminal device an instruction to precode each of a number, L, of DeModulation Reference Signals (DMRSs) using a number, N, of linearly independent precoders, respectively; receiving from the terminal device L*N precoded DMRSs; estimating an equivalent channel associated with an uplink channel from the terminal device to the network device based on one or more of the L*N precoded DMRSs; and determining the uplink channel from the equivalent channel based on the N precoders.

In an embodiment, the L*N precoded DMRSs can be received in N consecutive Transmission Time Intervals (TTIs), with L precoded DMRSs that are precoded using one of the N precoders being received in one of the N TTIs.

In an embodiment, each of the L DMRSs can be used for one-layer transmission, where L can be smaller than a number of antennas at the terminal device and L*N can be larger than or equal to the number of antennas at the terminal device.

In an embodiment, the number of antennas at the terminal device can be larger than or equal to 2.

In an embodiment, L can be equal to 1 and the number N can be larger than or equal to the number of antennas at the terminal device.

In an embodiment, the N precoders can be orthogonal to each other.

In an embodiment, the equivalent channel can be a combination of the uplink channel and one of the N precoders, and the equivalent channel can be estimated based on L of the L*N precoded DMRSs that are precoded using the one precoder.

In an embodiment, the equivalent channel can be an average of N equivalent channels each being a combination of the uplink channel and one of the N precoders, and the equivalent channel can be estimated based on L of the L*N precoded DMRSs that are precoded using the one precoder.

In an embodiment, the operation of determining can include: combining the N precoders into a precoding matrix; and deriving the uplink channel as a function of the equivalent channel and an inverse of the precoding matrix.

In an embodiment, the instruction can include an indication of the N precoders and/or can be transmitted to the terminal device via Downlink Control Information (DCI).

In an embodiment, the method can further include: determining a downlink channel from the network device to the terminal device based on the uplink channel.

According to a second aspect of the present disclosure, a network device is provided. The network device includes: a transmitting unit configured to transmit to a terminal device an instruction to precode each of a number, L, of DMRSs using a number, N, of linearly independent precoders, respectively. The network device further includes: a receiving unit configured to receive from the terminal device L*N precoded DMRSs. The network device further includes an estimating unit configured to estimate an equivalent channel associated with an uplink channel from the terminal device to the network device based on one or more of the L*N precoded DMRSs. The network device further includes a determining unit configured to determine the uplink channel from the equivalent channel based on the N precoders.

According to a third aspect of the present disclosure, a network device is provided. The network device includes one or more processors and one or more memories. The one or more memories contain instructions executable by the processors, whereby the network device is operative to perform the method according to the above first aspect.

According to a fourth aspect of the present disclosure, a computer readable storage medium is provided. The computer readable storage medium has computer program instructions stored thereon. The computer program instructions, when executed by a processor in a network device, cause the network device to perform the method according to the above first aspect.

According to a fifth aspect of the present disclosure, a method in a terminal device for facilitating channel estimation is provided. The method includes: receiving from a network device an instruction to precode each of a number, L, of DMRSs using a number, N, of linearly independent precoders, respectively; and transmitting to the network device L*N precoded DMRSs.

In an embodiment, the L*N precoded DMRSs can be transmitted in N consecutive Transmission Time Intervals (TTIs), with L precoded DMRSs that are precoded using one of the N precoders being transmitted in one of the N TTIs.

In an embodiment, each of the L DMRSs can be used for one-layer transmission, where L can be smaller than a number of antennas at the terminal device and L*N can be larger than or equal to the number of antennas at the terminal device.

In an embodiment, the number of antennas at the terminal device can be larger than or equal to 2.

In an embodiment, L is equal to 1 and the number N can be larger than or equal to the number of antennas at the terminal device.

In an embodiment, the N precoders can be orthogonal to each other.

In an embodiment, the instruction can include an indication of the N precoders and/or can be received from the network device via Downlink Control Information (DCI).

According to a sixth aspect of the present disclosure, a terminal device is provided. The terminal device includes a receiving unit configured to receive from a network device an instruction to precode each of a number, L, of DMRSs using a number, N, of linearly independent precoders, respectively. The terminal device further includes a transmitting unit configured to transmit to the network device L*N precoded DMRSs.

According to a seventh aspect of the present disclosure, a terminal device is provided. The terminal device includes one or more processors and one or more memories. The one or more memories contain instructions executable by the processors, whereby the terminal device is operative to perform the method according to the fifth aspect.

According to an eighth aspect of the present disclosure, a computer readable storage medium is provided. The computer readable storage medium has computer program instructions stored thereon. The computer program instructions, when executed by a processor in a terminal device, cause the terminal device to perform the method according to the fifth aspect.

According to a ninth aspect of the present disclosure, a communication system is provided. The communication system includes a host computer including: processing circuitry configured to provide user data; and a communication interface configured to forward the user data to a cellular network for transmission to a UE. The cellular network includes a base station having a radio interface and processing circuitry. The base station's processing circuitry is configured to perform the method according to the first aspect.

In an embodiment, the communication system can further include the base station.

In an embodiment, the communication system can further include the UE. The UE is configured to communicate with the base station.

In an embodiment, the processing circuitry of the host computer can be configured to execute a host application, thereby providing the user data. The UE can include processing circuitry configured to execute a client application associated with the host application.

According to a tenth aspect of the present disclosure, a method is provided. The method is implemented in a communication system including a host computer, a base station and a UE. The method includes: at the host computer, providing user data; and at the host computer, initiating a transmission carrying the user data to the UE via a cellular network comprising the base station. The base station can perform the method according to the first aspect.

In an embodiment, the method further can include: at the base station, transmitting the user data.

In an embodiment, the user data can be provided at the host computer by executing a host application. The method can further include: at the UE, executing a client application associated with the host application.

According to an eleventh aspect of the present disclosure, a communication system is provided. The communication system includes a host computer including: processing circuitry configured to provide user data; and a communication interface configured to forward user data to a cellular network for transmission to a UE. The UE includes a radio interface and processing circuitry.

The UE's processing circuitry is configured to perform the method according to the fifth aspect.

In an embodiment, the communication system can further include the UE.

In an embodiment, the cellular network can further include a base station configured to communicate with the UE.

In an embodiment, the processing circuitry of the host computer can be configured to execute a host application, thereby providing the user data. The UE's processing circuitry can be configured to execute a client application associated with the host application.

According to a twelfth aspect of the present disclosure, a method is provided. The method is implemented in a communication system including a host computer, a base station and a UE. The method includes: at the host computer, providing user data; and at the host computer, initiating a transmission carrying the user data to the UE via a cellular network comprising the base station. The UE can perform the method according to the fifth aspect.

In an embodiment, the method can further include: at the UE, receiving the user data from the base station.

According to a thirteenth aspect of the present disclosure, a communication system is provided. The communication system includes a host computer including: a communication interface configured to receive user data originating from a transmission from a UE to a base station. The UE includes a radio interface and processing circuitry. The UE's processing circuitry is configured to: perform the method according to the fifth aspect.

In an embodiment, the communication system can further include the UE.

In an embodiment, the communication system can further include the base station. The base station can include a radio interface configured to communicate with the UE and a communication interface configured to forward to the host computer the user data carried by a transmission from the UE to the base station.

In an embodiment, the processing circuitry of the host computer can be configured to execute a host application. The UE's processing circuitry can be configured to execute a client application associated with the host application, thereby providing the user data.

In an embodiment, the processing circuitry of the host computer can be configured to execute a host application, thereby providing request data. The UE's processing circuitry can be configured to execute a client application associated with the host application, thereby providing the user data in response to the request data.

According to a fourteenth aspect of the present disclosure, a method is provided. The method is implemented in a communication system including a host computer, a base station and a UE. The method includes: at the host computer, receiving user data transmitted to the base station from the UE. The UE can perform the method according to the fifth aspect.

In an embodiment, the method can further include: at the UE, providing the user data to the base station.

In an embodiment, the method can further include: at the UE, executing a client application, thereby providing the user data to be transmitted; and at the host computer, executing a host application associated with the client application.

In an embodiment, the method can further include: at the UE, executing a client application; and at the UE, receiving input data to the client application, the input data being provided at the host computer by executing a host application associated with the client application. The user data to be transmitted is provided by the client application in response to the input data.

According to a fifteenth aspect of the present disclosure, a communication system is provided. The communication system includes a host computer including a communication interface configured to receive user data originating from a transmission from a UE to a base station. The base station includes a radio interface and processing circuitry. The base station's processing circuitry is configured to perform the method according to the first aspect.

In an embodiment, the communication system can further include the base station.

In an embodiment, the communication system can further include the UE. The UE can be configured to communicate with the base station.

In an embodiment, the processing circuitry of the host computer can be configured to execute a host application; the UE can be configured to execute a client application associated with the host application, thereby providing the user data to be received by the host computer.

According to a sixteenth aspect of the present disclosure, a method is provided. The method is implemented in a communication system including a host computer, a base station and a UE. The method includes: at the host computer, receiving, from the base station, user data originating from a transmission which the base station has received from the UE. The base station can perform the method according to the first aspect.

In an embodiment, the method can further include: at the base station, receiving the user data from the UE.

In an embodiment, the method can further include: at the base station, initiating a transmission of the received user data to the host computer.

With the embodiments of the present disclosure, a network device transmits to a terminal device an instruction to precode each of L DMRSs using N linearly independent precoders, respectively. Upon receiving from the terminal device L*N precoded DMRSs, the network device estimates an equivalent channel associated with an uplink channel from the terminal device to the network device based on one or more of the L*N precoded DMRSs and determines the uplink channel from the equivalent channel based on the N precoders. In this way, the network device can obtain an estimate of the actual uplink channel, and possibly the actual downlink channel, based on the precoded DMRSs.

BRIEF DESCRIPTION OF THE DRAWINGS

The above and other objects, features and advantages will be more apparent from the following description of embodiments with reference to the figures, in which.

DETAILED DESCRIPTION

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

As discussed above, the channel estimation can be based on the SRS. However, the capacity of SRS is limited. In a typical Long Term Evolution (LTE) TDD configuration (TDD Configuration 2, Special Subframe Configuration 7, Cyclic Shift 4, Comb 2), up to 32 UEs can each be allocated with an SRS every 10 ms. However, there may be quite many UEs in a cell, and this 32 SRS capacity may need be shared among hundreds of UEs. In order to overcome the capacity issue of SRS, it is possible to estimate a channel by measuring an uplink DeModulation Reference Signal (DMRS). Thus, more UEs can be grouped using the MU-MIMO technique and the system throughput can be improved.

If one single UE is equipped with more than one antenna, it is also possible to enable spatial multiplexing per UE to increase uplink throughput for the UE. Furthermore, codebook based solution has been proposed for uplink transmission such that an eNB can control how layers are multiplexed for transmission. The DMRS transmitted from a UE to an eNB is also precoded according to a codebook configured by the eNB. When the DMRS is precoded, the channel estimated based on the measurement of the DMRS would not be the actual channel and thus cannot be used directly e.g., to determine beamforming weights for MIMO transmissions.

Figure 1:
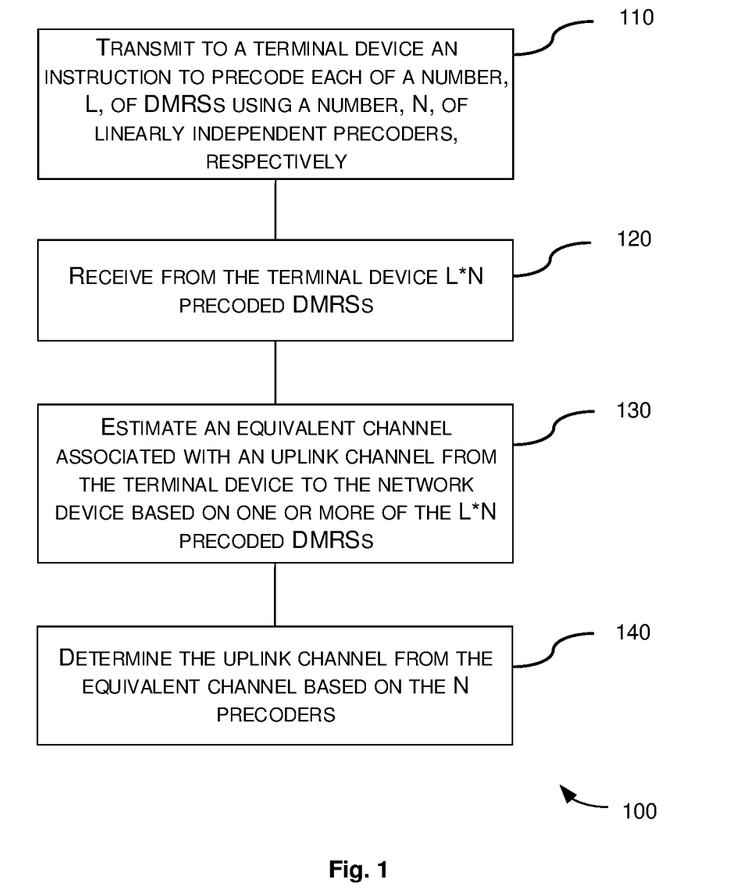
FIG. 1 is a flowchart illustrating a method in a network device for channel estimation according to an embodiment of the present disclosure.

FIG. 1 is a flowchart illustrating a method 100 for channel estimation according to an embodiment of the present disclosure. The method 100 can be performed at a network device.

At block 110, the network device transmits to a terminal device an instruction to precode each of a number, L, of DMRSs using a number, N, of linearly independent precoders, respectively. In an example, the instruction can include an indication of the N precoders. The instruction can be transmitted to the terminal device via Downlink Control Information (DCI), e.g., over Physical Downlink Control Channel (PDCCH).

Here, each of the L DMRSs can be used for one-layer transmission. L can be smaller than a number of antennas at the terminal device and L*N can be larger than or equal to the number of antennas at the terminal device. The number of antennas at the terminal device can be larger than or equal to 2. In an embodiment, L can be equal to 1 and the number N can be larger than or equal to the number of antennas at the terminal device.

Preferably, the N linearly independent precoders can be orthogonal to each other.

At block 120, the network device receives from the terminal device L*N DMRSs that are precoded using the N precoders, respectively. The L*N precoded DMRSs can be received in a relatively short time period with respect to channel variation. Preferably, the L*N precoded DMRSs can be received in N consecutive TTIs or slots, with L precoded DMRSs that are precoded using one of the N precoders being received in one of the N TTIs. Each TTI or slot can have a duration of e.g., 1 ms. Alternatively, the L*N precoded DMRSs can be received in N adjacent Physical Resource Blocks (PRBs) in one TTI, with L precoded DMRSs that are precoded using one of the N precoders being received in one of the N PRBs.

At block 130, the network device estimates an equivalent channel associated with an uplink channel from the terminal device to the network device based on one or more of the L*N precoded DMRSs.

In an example, the equivalent channel can be a combination of the uplink channel and one of the N precoders. The equivalent channel can be estimated based on L of the L*N precoded DMRSs that are precoded using the one precoder.

Alternatively, the equivalent channel can be an average of N equivalent channels each being a combination of the uplink channel and one of the N precoders. The equivalent channel can be estimated based on L of the L*N precoded DMRSs that are precoded using the one precoder.

At block 140, the network device determines the uplink channel from the equivalent channel based on the N precoders.

In particular, in the block 140, the N precoders can be combined into a precoding matrix and the uplink channel can be derived as a function of the equivalent channel and an inverse of the precoding matrix. It is assumed here that the uplink channel remains substantially constant during the short time period (e.g., N consecutive TTIs).

In a TDD system, for example, a downlink channel from the network device to the terminal device can be determined based on the uplink channel, by utilizing the channel reciprocity.

The principle of the above method can be described mathematically as follows.

It is assumed here that the network device is equipped with M antennas and the terminal device is equipped with N antennas, where M≥2, N≥2. It is also assumed that L=1 and the number of precoders, and thus the number of precoded DMRSs, is N.

Let s denote the DMRS and an N-dimensional vector $P_i$, $i=1, 2, \ldots, N$, denote the i-th precoder. The precoded DMRS can be represented as:

$$d_i = P_i s, \quad (1)$$

where $d_i$ is an N-dimensional vector and denotes the i-th precoded DMRS that is precoded $P_i$.

A signal received at the network device can be represented as:

$$r_i = H_i d_i + n_i = H_i P_i s + n_i, \quad (2)$$

where $r_i$ is an M-dimensional vector and denotes the signal received at the network device, $H_i$ is an M*N matrix and denotes the uplink channel from the terminal device to the network device, and $n_i$ is an N-dimensional vector and denotes a noise at the network device.

Let $H'_i = H_i P_i$ denotes an equivalent channel, the above equation (3) can be rewritten as:

$$r_i = H'_i s + n_i. \quad (3)$$

The equivalent channel $H'_i$ can be estimated at the network device by using any appropriate channel estimation technique.

The N precoders can be combined into a precoding matrix:

$$P = [P_1 P_2 \ldots P_N]. \quad (3)$$

As discussed above, as the uplink channel typically remains substantially constant during a short time period (e.g., N consecutive TTIs), i.e., assuming $H_1 = H_2 = \ldots H_N$, the uplink channel $H_i$ can be estimated as:

$$H_i = H'_i P^{-1}. \quad (4)$$

Alternatively, an average of the N equivalent channels can be calculated as:

$$H'_{avg} = (H'_1 + H'_2 + \ldots H'_N)/N. \quad (5)$$

The uplink channel can be estimated as:

$$H_{UL} = H'_{avg} P^{-1}. \quad (6)$$

Accordingly, when the channel reciprocity is applicable, the downlink channel can be calculated as:

$$H_{DL} = H_i^T, \quad (7)$$

or $$H_{DL} = H_{UL}^T, \quad (8)$$

where $(\ )^T$ denotes transposition.

Figure 2:
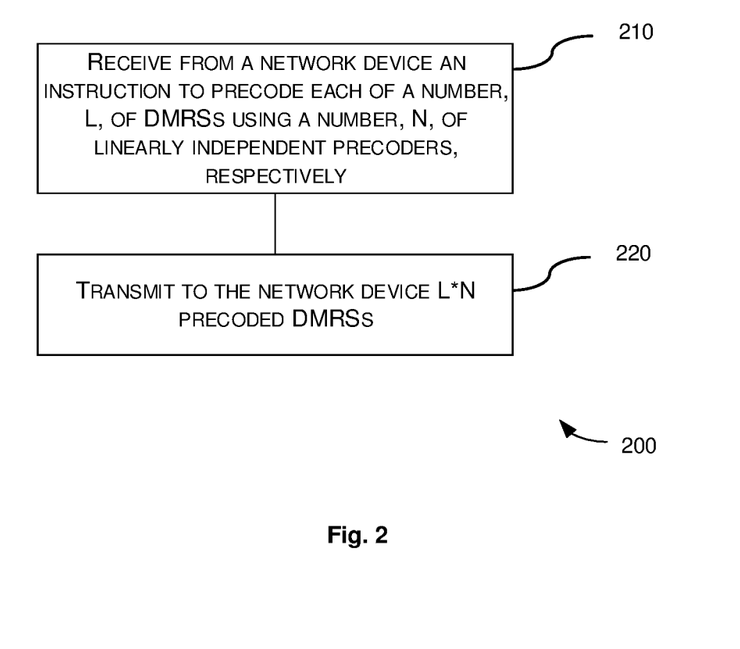
FIG. 2 is a flowchart illustrating a terminal device for facilitating channel estimation according to an embodiment of the present disclosure.

FIG. 2 is a flowchart illustrating a method 200 for facilitating channel estimation according to an embodiment of the present disclosure. The method 200 can be performed at a terminal device.

At block 210, the terminal device receives from a network device an instruction to precode each of a number, L, of DMRSs using a number, N, of linearly independent precoders, respectively. In an example, the instruction can include an indication of the N precoders. The instruction can be received via DCI, e.g., over PDCCH.

Here, each of the L DMRSs is used for one-layer transmission. L can be smaller than a number of antennas at the terminal device and L*N can be larger than or equal to the number of antennas at the terminal device. The number of antennas at the terminal device can be larger than or equal to 2. In an embodiment, L can be equal to 1 and the number N can be larger than or equal to the number of antennas at the terminal device.

Preferably, the N linearly independent precoders can be orthogonal to each other.

At block 220, the terminal devices transmits to the network device L*N precoded DMRSs. Here, the L*N precoded DMRSs can be transmitted in a relatively short time period with respect to channel variation. Preferably, the L*N precoded DMRSs can be transmitted in N consecutive TTIs or slots, with L precoded DMRSs that are precoded using one of the N precoders being transmitted in one of the N TTIs. Alternatively, the L*N precoded DMRSs can be transmitted in N adjacent PRBs in one TTI, with L precoded DMRSs that are precoded using one of the N precoders being transmitted in one of the N PRBs.

Figure 3:
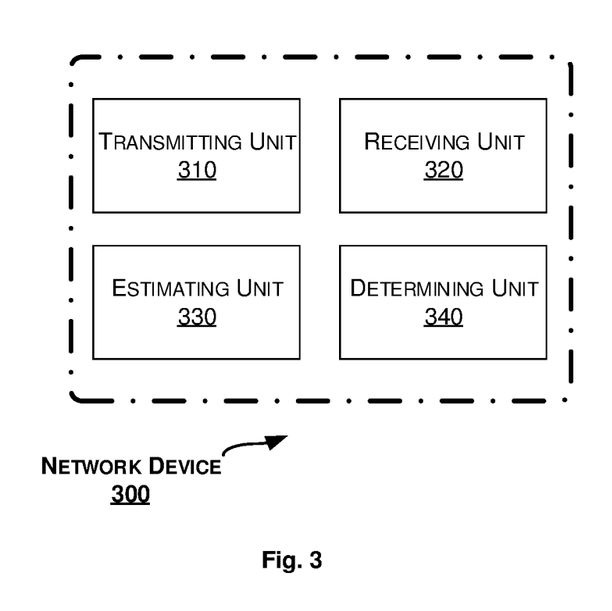
FIG. 3 is a block diagram of a network device according to an embodiment of the present disclosure.

Correspondingly to the method 100 as described above, a network device is provided. FIG. 3 is a block diagram of a network device 300 according to an embodiment of the present disclosure.

As shown in FIG. 3, the network device 300 includes a transmitting unit 310 configured to transmit to a terminal device an instruction to precode each of a number, L, of DMRSs using a number, N, of linearly independent precoders, respectively. The network device 300 further includes a receiving unit 320 configured to receive from the terminal device L*N precoded DMRSs. The network device 300 further includes an estimating unit 330 configured to estimate an equivalent channel associated with an uplink channel from the terminal device to the network device based on one or more of the L*N precoded DMRSs. The network device 300 further includes a determining unit 340 configured to determine the uplink channel from the equivalent channel based on the N precoders.

In an embodiment, the L*N precoded DMRSs can be received in N consecutive Transmission Time Intervals (TTIs), with L precoded DMRSs that are precoded using one of the N precoders being received in one of the N TTIs.

In an embodiment, each of the L DMRSs can be used for one-layer transmission, where L can be smaller than a number of antennas at the terminal device and L*N can be larger than or equal to the number of antennas at the terminal device.

In an embodiment, the number of antennas at the terminal device can be larger than or equal to 2.

In an embodiment, L can be equal to 1 and the number N can be larger than or equal to the number of antennas at the terminal device.

In an embodiment, the N precoders can be orthogonal to each other.

In an embodiment, the equivalent channel can be a combination of the uplink channel and one of the N precoders, and the equivalent channel can be estimated based on L of the L*N precoded DMRSs that are precoded using the one precoder.

In an embodiment, the equivalent channel can be an average of N equivalent channels each being a combination of the uplink channel and one of the N precoders, and the equivalent channel can be estimated based on L of the L*N precoded DMRSs that are precoded using the one precoder.

In an embodiment, the determining unit 340 can be configured to combine the N precoders into a precoding matrix; and derive the uplink channel as a function of the equivalent channel and an inverse of the precoding matrix.

In an embodiment, the instruction can include an indication of the N precoders and can be transmitted to the terminal device via Downlink Control Information (DCI).

In an embodiment, the determining unit 340 can further be configured to determine a downlink channel from the network device to the terminal device based on the uplink channel.

The transmitting unit 310, the receiving unit 320, the estimating unit 330 and the determining unit 340 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 1.

Figure 4:
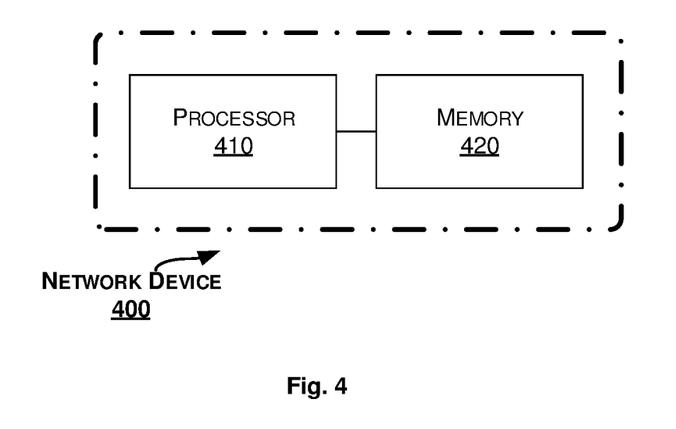
FIG. 4 is a block diagram of a network device according to another embodiment of the present disclosure.

FIG. 4 is a block diagram of a network device 400 according to another embodiment of the present disclosure.

The network device 400 includes one or more processors 410 and one or more memories 420. The memories 420 contain instructions executable by the processors 410 whereby the network device 400 is operative to perform the actions, e.g., of the procedure described earlier in conjunction with FIG. 1. Particularly, the memories 420 contain instructions executable by the processors 410 whereby the network device 400 is operative to: transmit to a terminal device an instruction to precode each of a number, L, of DMRSs using a number, N, of linearly independent precoders, respectively; receive from the terminal device L*N precoded DMRSs; estimate an equivalent channel associated with an uplink channel from the terminal device to the network device based on one or more of the L*N precoded DMRSs; and determine the uplink channel from the equivalent channel based on the N precoders.

In an embodiment, the L*N precoded DMRSs can be received in N consecutive Transmission Time Intervals (TTIs), with L precoded DMRSs that are precoded using one of the N precoders being received in one of the N TTIs.

In an embodiment, each of the L DMRSs is used for one-layer transmission, where L can be smaller than a number of antennas at the terminal device and L*N can be larger than or equal to the number of antennas at the terminal device.

In an embodiment, the number of antennas at the terminal device can be larger than or equal to 2.

In an embodiment, L can be equal to 1 and the number N can be larger than or equal to the number of antennas at the terminal device.

In an embodiment, the N precoders can be orthogonal to each other.

In an embodiment, the equivalent channel can be a combination of the uplink channel and one of the N precoders, and the equivalent channel can be estimated based on L of the L*N precoded DMRSs that are precoded using the one precoder.

In an embodiment, the equivalent channel can be an average of N equivalent channels each being a combination of the uplink channel and one of the N precoders, and the equivalent channel can be estimated based on L of the L*N precoded DMRSs that are precoded using the one precoder.

In an embodiment, the determining unit 340 can be configured to combine the N precoders into a precoding matrix; and derive the uplink channel as a function of the equivalent channel and an inverse of the precoding matrix.

In an embodiment, the instruction can include an indication of the N precoders and can be transmitted to the terminal device via Downlink Control Information (DCI).

In an embodiment, the memories 420 can further contain instructions executable by the processors 410 whereby the network device 400 is operative to determine a downlink channel from the network device to the terminal device based on the uplink channel.

Figure 5:
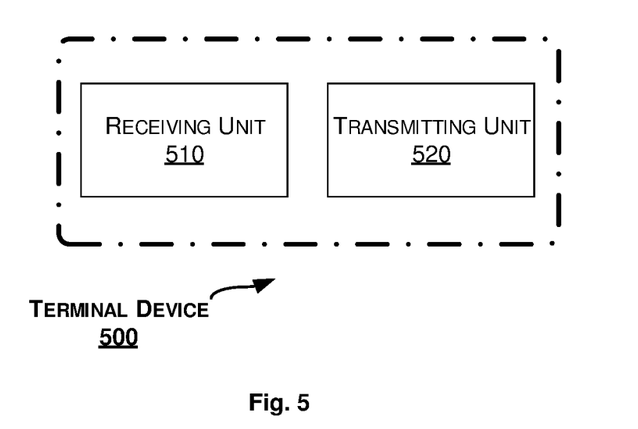
FIG. 5 is a block diagram of a terminal device according to an embodiment of the present disclosure.

Correspondingly to the method 200 as described above, a terminal device is provided. FIG. 5 is a block diagram of a terminal device 500 according to an embodiment of the present disclosure.

As shown in FIG. 5, the terminal device 500 includes a receiving unit 510 configured to receive from a network device an instruction to precode each of a number, L, of DMRSs using a number, N, of linearly independent precoders, respectively. The terminal device 500 includes a transmitting unit 520 configured to transmit to the network device L*N precoded DMRSs.

In an embodiment, the L*N precoded DMRSs can be transmitted in N consecutive Transmission Time Intervals (TTIs), with L precoded DMRSs that are precoded using one of the N precoders being transmitted in one of the N TTIs.

In an embodiment, each of the L DMRSs can be used for one-layer transmission, where L can be smaller than a number of antennas at the terminal device and L*N can be larger than or equal to the number of antennas at the terminal device.

In an embodiment, the number of antennas at the terminal device can be larger than or equal to 2.

In an embodiment, L can be equal to 1 and the number N can be larger than or equal to the number of antennas at the terminal device.

In an embodiment, the N precoders can be orthogonal to each other.

In an embodiment, the instruction can include an indication of the N precoders and can be received from the network device via Downlink Control Information (DCI).

The receiving unit 510 and the transmitting unit 520 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 2.

Figure 6:
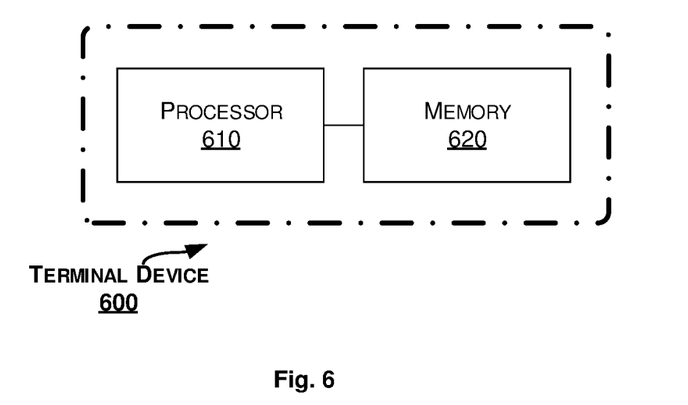
FIG. 6 is a block diagram of a terminal device according to another embodiment of the present disclosure.

FIG. 6 is a block diagram of a terminal device 600 according to another embodiment of the present disclosure.

The terminal device 600 includes one or more processors 610 and one or more memories 620. The memories 620 contain instructions executable by the processors 610 whereby the terminal device 600 is operative to perform the actions, e.g., of the procedure described earlier in conjunction with FIG. 2. Particularly, the memories 620 contain instructions executable by the processors 610 whereby the terminal device 600 is operative to: receive from a network device an instruction to precode each of a number, L, of DMRSs using a number, N, of linearly independent precoders, respectively; and transmit to the network device L*N precoded DMRSs.

In an embodiment, the L*N precoded DMRSs can be transmitted in N consecutive Transmission Time Intervals (TTIs), with L precoded DMRSs that are precoded using one of the N precoders being transmitted in one of the N TTIs.

In an embodiment, each of the L DMRSs can be used for one-layer transmission, where L can be smaller than a number of antennas at the terminal device and L*N can be larger than or equal to the number of antennas at the terminal device.

In an embodiment, the number of antennas at the terminal device can be larger than or equal to 2.

In an embodiment, L can be equal to 1 and the number N can be larger than or equal to the number of antennas at the terminal device.

In an embodiment, the N precoders can be orthogonal to each other.

In an embodiment, the instruction can include an indication of the N precoders and can be received from the network device via Downlink Control Information (DCI).

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processors 410, cause the network device 400 to perform the actions, e.g., of the procedure described earlier in conjunction with FIG. 1; or code/computer readable instructions, which when executed by the processors 610, cause the terminal device 600 to perform the actions, e.g., of the procedure described earlier in conjunction with FIG. 2.

The computer program product may be configured as a computer program code structured in computer program modules. The computer program modules could essentially perform the actions of the flow illustrated in FIG. 1 or 2.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 7:
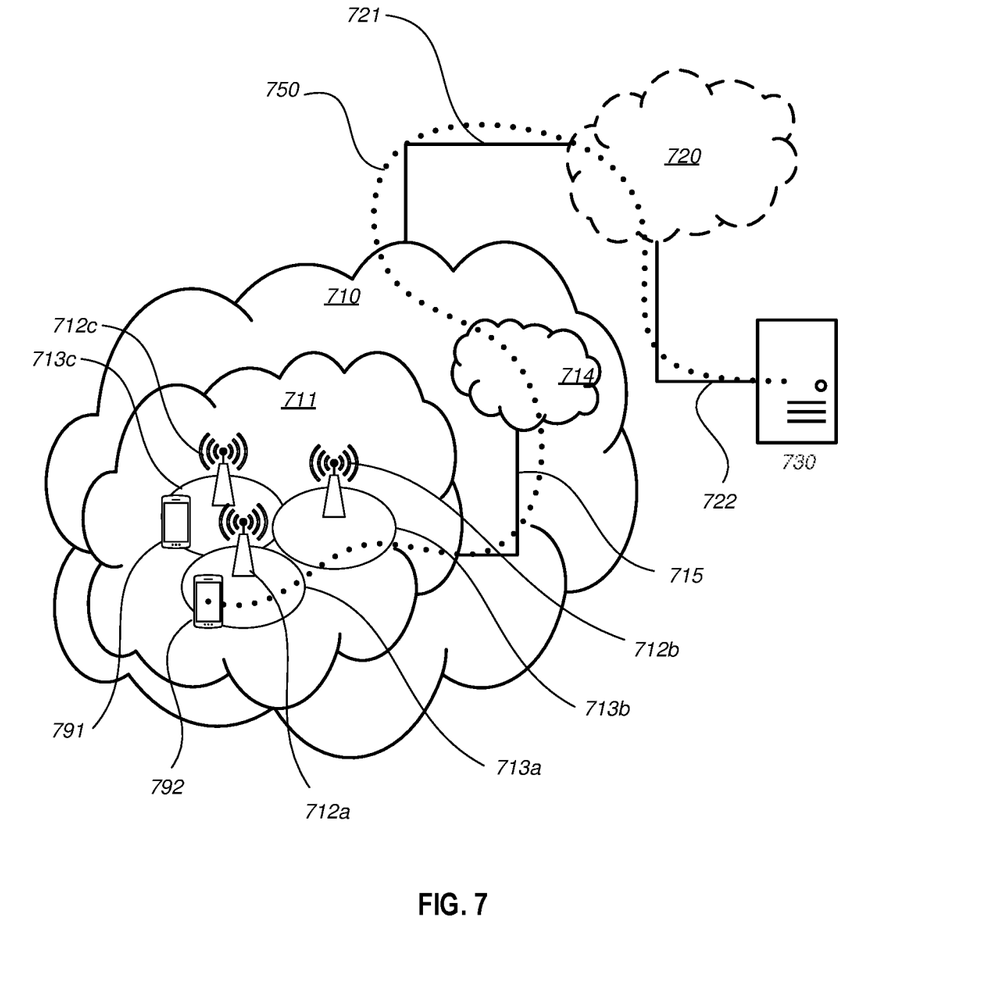
FIG. 7 schematically illustrates a telecommunication network connected via an intermediate network to a host computer.

With reference to FIG. 7, in accordance with an embodiment, a communication system includes a telecommunication network 710, such as a 3GPP-type cellular network, which comprises an access network 711, such as a radio access network, and a core network 714. The access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to the core network 714 over a wired or wireless connection 715. A first user equipment (UE) 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. The connections 721, 722 between the telecommunication network 710 and the host computer 730 may extend directly from the core network 714 to the host computer 730 or may go via an optional intermediate network 720. The intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system of FIG. 7 as a whole enables connectivity between one of the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, a base station 712 may not or need not be informed about the past routing of an incoming downlink communication with data originating from a host computer 730 to be forwarded (e.g., handed over) to a connected UE 791. Similarly, the base station 712 need not be aware of the future routing of an outgoing uplink communication originating from the UE 791 towards the host computer 730.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as a UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with a UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

Figure 8:
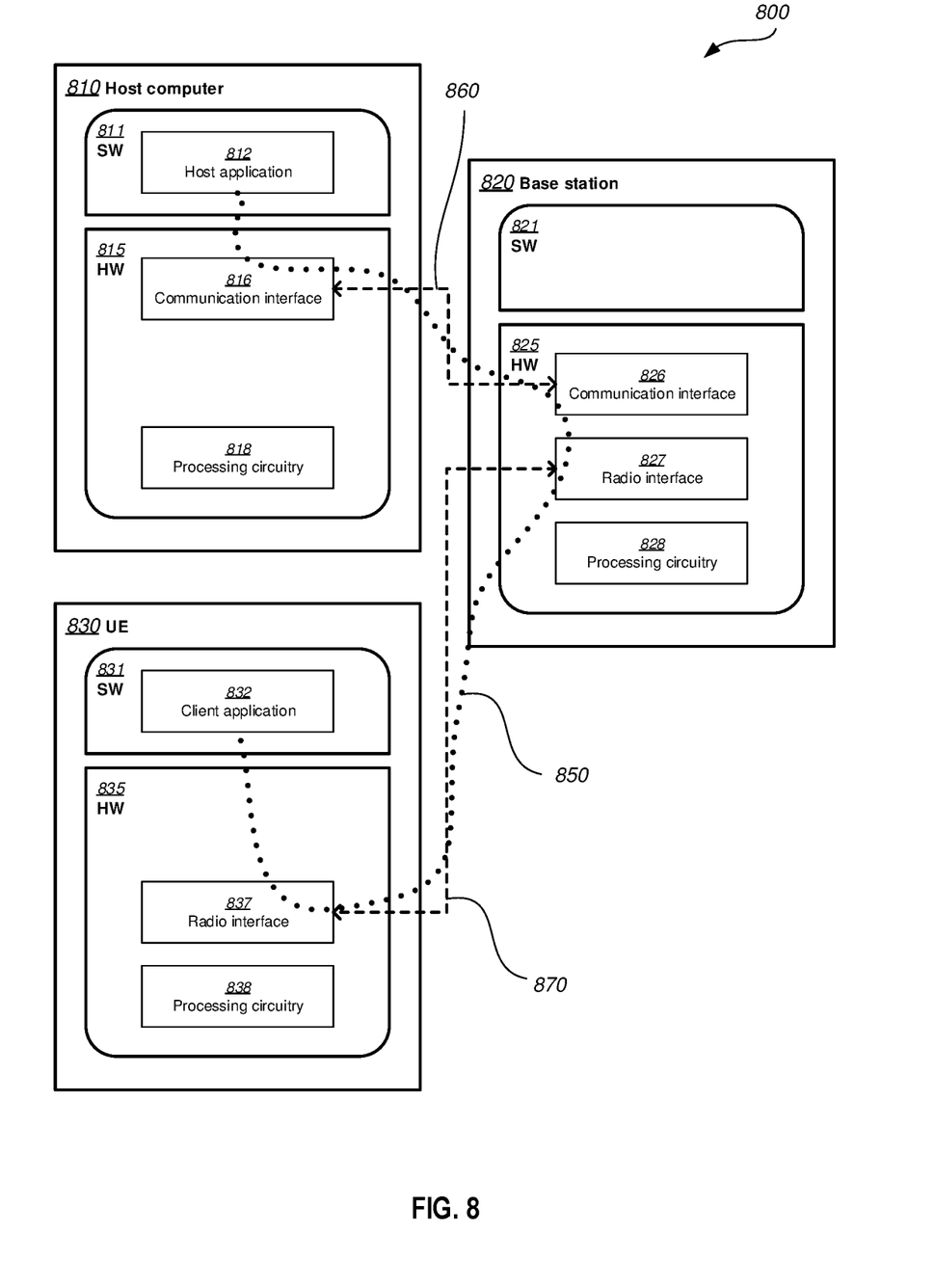
FIG. 8 is a generalized block diagram of a host computer communicating via a base station with a user equipment over a partially wireless connection.

It is noted that the host computer 810, base station 820 and UE 830 illustrated in FIG. 8 may be identical to the host computer 730, one of the base stations 712a, 712b, 712c and one of the UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the use equipment 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

The wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the teachings of these embodiments may improve the data rate and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 850 between the host computer 810 and UE 830, in response to variations in the measurement results. The measurement procedure and/or the network functionality for reconfiguring the OTT connection 850 may be implemented in the software 811 of the host computer 810 or in the software 831 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer's 810 measurements of throughput, propagation times, latency and the like. The measurements may be implemented in that the software 811, 831 causes messages to be transmitted, in particular empty or 'dummy' messages, using the OTT connection 850 while it monitors propagation times, errors etc.

Figure 9:
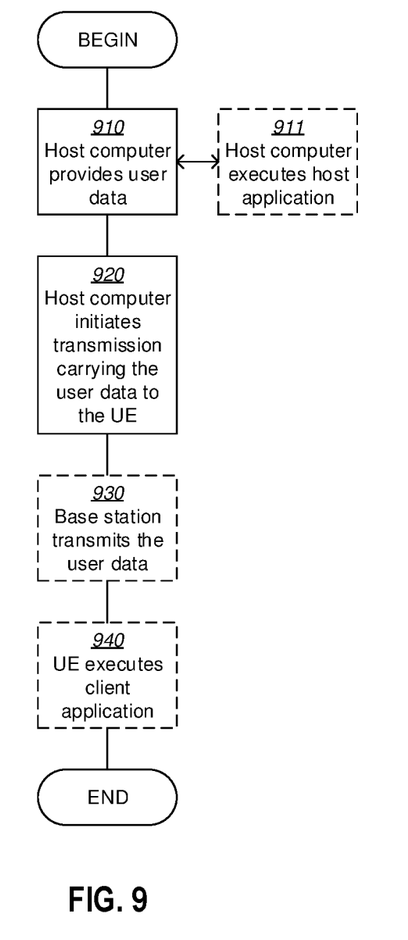
FIGS. 9 to 12 are flowcharts illustrating methods implemented in a communication system including a host computer, a base station and a user equipment.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In a first step 910 of the method, the host computer provides user data. In an optional substep 911 of the first step 910, the host computer provides the user data by executing a host application. In a second step 920, the host computer initiates a transmission carrying the user data to the UE. In an optional third step 930, the base station transmits to the UE the user data which was carried in the transmission that the host computer initiated, in accordance with the teachings of the embodiments described throughout this disclosure. In an optional fourth step 940, the UE executes a client application associated with the host application executed by the host computer.

Figure 10:
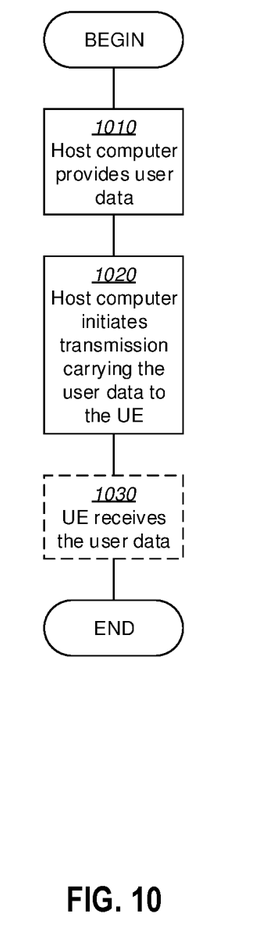

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In a first step 1010 of the method, the host computer provides user data. In an optional substep (not shown) the host computer provides the user data by executing a host application. In a second step 1020, the host computer initiates a transmission carrying the user data to the UE. The transmission may pass via the base station, in accordance with the teachings of the embodiments described throughout this disclosure. In an optional third step 1030, the UE receives the user data carried in the transmission.

Figure 11:
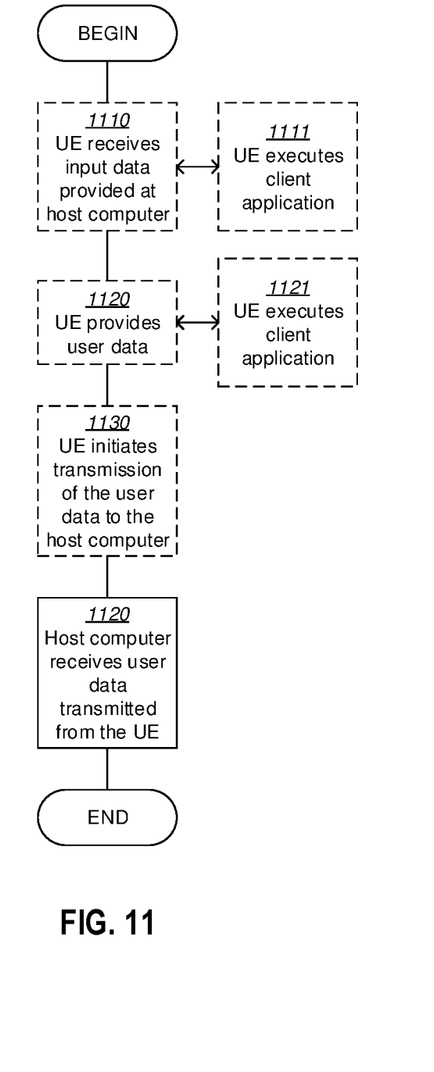

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In an optional first step 1110 of the method, the UE receives input data provided by the host computer. Additionally or alternatively, in an optional second step 1120, the UE provides user data. In an optional substep 1121 of the second step 1120, the UE provides the user data by executing a client application. In a further optional substep 1111 of the first step 1110, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1130, transmission of the user data to the host computer. In a fourth step 1140 of the method, the host computer receives the user data transmitted from the UE, in accordance with the teachings of the embodiments described throughout this disclosure.

Figure 12:
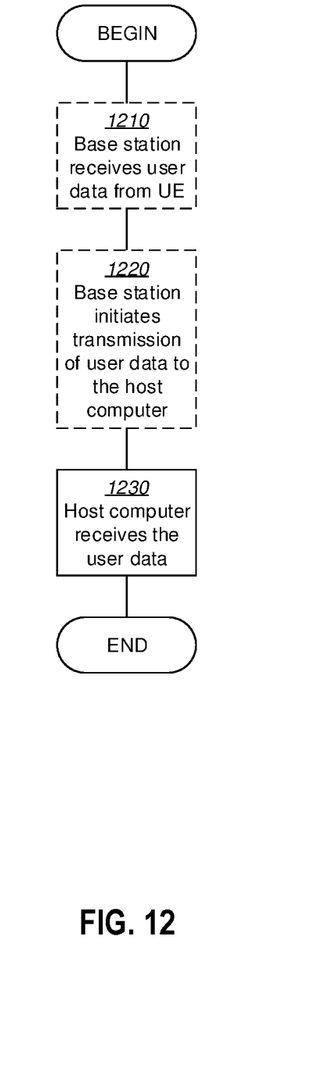

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In an optional first step 1210 of the method, in accordance with the teachings of the embodiments described throughout this disclosure, the base station receives user data from the UE. In an optional second step 1220, the base station initiates transmission of the received user data to the host computer. In a third step 1230, the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A network device for channel estimation, the network device comprising one or more processors and one or more memories comprising instructions executable by the processors, whereby the network device is configured to:
   transmit, to a terminal device, an instruction to precode each of a number, L, of DeModulation Reference Signals (DMRSs) using a number, N, of linearly independent precoders, respectively;
   receive, from the terminal device, L*N precoded DMRSs;
   estimate an equivalent channel associated with an uplink channel from the terminal device to the network device based on one or more of the L*N precoded DMRSs; and
   determine the uplink channel from the equivalent channel based on the N precoders.

2. The network device of claim 1, wherein the L*N precoded DMRSs are received in N consecutive Transmission Time Intervals (TTIs) with L precoded DMRSs that are precoded using one of the N precoders being received in one of the N TTIs.

3. The network device of claim 1, wherein each of the L DMRSs is used for one-layer transmission, where L is smaller than a number of antennas at the terminal device, and wherein L*N is larger than or equal to the number of antennas at the terminal device.

4. The network device of claim 3, wherein the number of antennas at the terminal device is larger than or equal to 2.

5. The network device of claim 3, wherein L is equal to 1 and the number N is larger than or equal to the number of antennas at the terminal device.

6. The network device of claim 1, wherein the N precoders are orthogonal to each other.

7. The network device of claim 1, wherein the equivalent channel is a combination of the uplink channel and one of the N precoders, and the equivalent channel is estimated based on L of the L*N precoded DMRSs that are precoded using the one precoder.

8. The network device of claim 1, wherein the equivalent channel is an average of N equivalent channels each being a combination of the uplink channel and one of the N precoders, and the equivalent channel is estimated based on L of the L*N precoded DMRSs that are precoded using the one precoder.

9. The network device of claim 1, wherein the one or more memories comprise instructions executable by the processors whereby the network device is configured to:
combine the N precoders into a precoding matrix; and
derive the uplink channel as a function of the equivalent channel and an inverse of the precoding matrix.

10. The network device of claim 1, wherein the instruction comprises an indication of the N precoders and/or is transmitted to the terminal device via Downlink Control Information (DCI).

11. The network device of claim 1, wherein the one or more memories comprise instructions executable by the processors whereby the network device is configured to determine a downlink channel from the network device to the terminal device based on the uplink channel.

12. A terminal device comprising one or more processors and one or more memories comprising instructions executable by the processors, whereby the terminal device is configured to:
receive, from a network device in a wireless communication network, an instruction to precode each of a number, L, of DeModulation Reference Signals (DMRSs) using a number, N, of linearly independent precoders, respectively; and
transmit, to the network device, L*N precoded DMRSs.

13. The terminal device of claim 12, wherein each of the L DMRSs is used for one-layer transmission, where L is smaller than a number of antennas at the terminal device, and wherein L*N is larger than or equal to the number of antennas at the terminal device.

14. The terminal device of claim 13, wherein the number of antennas at the terminal device is larger than or equal to 2.

15. The terminal device of claim 13, wherein L is equal to 1 and the number N is larger than or equal to the number of antennas at the terminal device.

16. The terminal device of claim 12, wherein the N precoders are orthogonal to each other.

17. The terminal device of claim 12, wherein the instruction comprises an indication of the N precoders and/or is received from the network device via Downlink Control Information (DCI).

18. A non-transitory computer-readable storage medium on which is stored instructions that, when executed by one or more processors of a terminal device, cause the terminal device to:
receive, from a network device, an instruction to precode each of a number, L, of DeModulation Reference Signals (DMRSs) using a number, N, of linearly independent precoders, respectively; and
transmit, to the network device, L*N precoded DMRSs.

* * * * *